United States Patent
Ohba (10) Patent No.: US 8,894,153 B2
(45) Date of Patent: Nov. 25, 2014

(54) LOCK DEVICE OF VEHICLE SEAT

(71) Applicant: Fuji Kiko Co., LTD., Kosai (JP)

(72) Inventor: Hironori Ohba, Hamamatsu (JP)

(73) Assignee: Fuji Kiko Co., Ltd., Kosai-shi (JP)

( * ) Notice: Subject to any disclaimer, the term of this patent is extended or adjusted under 35 U.S.C. 154(b) by 32 days.

(21) Appl. No.: 13/871,124

(22) Filed: Apr. 26, 2013

(65) Prior Publication Data

US 2013/0285429 A1  Oct. 31, 2013

(30) Foreign Application Priority Data

Apr. 27, 2012 (JP) .................................. 2012-101976

(51) Int. Cl.
*B60N 2/10* (2006.01)
*B60N 2/20* (2006.01)
*B60N 2/235* (2006.01)
*B60N 2/015* (2006.01)
*B60N 2/36* (2006.01)

(52) U.S. Cl.
CPC .......... *B60N 2/2352* (2013.01); *B60N 2/01583* (2013.01); *B60N 2/366* (2013.01)
USPC ................. 297/378.13; 296/65.03; 296/65.17

(58) Field of Classification Search
CPC ...................................................... B60N 2/366
USPC ........................ 297/378.13; 296/65.03, 65.17
See application file for complete search history.

(56) References Cited

U.S. PATENT DOCUMENTS

| 7,455,336 | B2 | 11/2008 | Bäumchen et al. | |
| 7,494,187 | B2* | 2/2009 | Inoue et al. | 297/378.13 |
| 8,226,169 | B2* | 7/2012 | Kreuels et al. | 297/378.13 |
| 8,590,973 | B2* | 11/2013 | Matsuura et al. | 297/378.13 |
| 8,727,443 | B2* | 5/2014 | Vedder et al. | 297/378.13 |
| 2013/0328372 | A1* | 12/2013 | Suzumura et al. | 297/378.13 |

FOREIGN PATENT DOCUMENTS

| JP | 2-96069 A | 4/1990 |
| JP | 2007-518000 A | 7/2007 |
| JP | 2008-265484 A | 11/2008 |

OTHER PUBLICATIONS

U.S. Appl. No. 13/871,137, filed Apr. 26, 2013, Ohba.

* cited by examiner

*Primary Examiner* — Anthony D Barfield
(74) *Attorney, Agent, or Firm* — Foley & Lardner LLP

(57) ABSTRACT

A seat lock device comprises a base plate having a striker receiving recess for receiving a striker, a latch plate having a striker receiving recess and rotatably connected to the base plate and rotatable between latch and unlatch positions with respect to the striker, a lock plate rotatably connected to the base plate and rotatable between lock and unlock positions with respect to the latch plate and a cover member having a U-shaped flange formed thereon and covering one major surface of the base plate having the U-shaped flange neatly disposed on a peripheral edge of the striker receiving recess. The seat lock device further comprises pawls provided by the base plate and depressed toward the cover member, recesses provided by the cover member for receiving the pawls respectively and stoppers provided by respective walls of the recesses for preventing the pawls from being disengaged from the recesses.

12 Claims, 9 Drawing Sheets

LOCK DEVICE OF VEHICLE SEAT

BACKGROUND OF THE INVENTION

1. Field of the Invention

The present invention relates in general to lock devices that lock one member to the other member, and more particularly to the lock devices of a type that locks a seat back or seat cushion of a vehicle seat relative to a body of the vehicle. More specifically, the present invention is concerned with the lock devices of a type having a cover member that is stably fixed to a base plate while covering essential parts of the lock device.

2. Description of Related Art

Hitherto, various lock devices have been proposed and put into practical use in the field of seats of motor vehicles. Some of them are of a type that can lock a pivotal seat back at an angular position relative to a seat cushion mounted on a floor of the vehicle.

Some lock devices of such type are disclosed in Japanese Laid-open Patent Application (tokkai) 2008-265484 and Japanese Translation of PCT International Application 2007-518000. A similar lock device that locks a trunk lid to a vehicle body is disclosed in Japanese Laid-open Patent Application (tokkaihei) 2-96069.

SUMMARY OF THE INVENTION

However, due to their inherent constructions, the lock devices disclosed by the above-mentioned publications fail to provide the users with satisfaction.

That is, a cover member for covering essential parts of the lock device is given little thought by the lock devices disclosed by the publications. In fact, for just convenience sake, the cover members employed in such lock devices are those of a type which is simply fitted to one part of the lock device. Accordingly, when, under cruising of the vehicle, a big shock is applied to the lock device, it sometimes occurs that the cover member is displaced from its original position spoiling the appearance of the lock device. In the worst case, the cover member comes off the lock device.

Furthermore, due to employment of an additional unit coated with a plastic film through which a smoothed rotation of a latch plate is intended, the lock devices disclosed by the publications "2008-265484" and "2007-518000" are bulky in construction, which is not matched with modernized vehicle seats. Furthermore, in the lock device disclosed by the publication "2-96069", in addition to the bulky construction, a noise trouble tends to occur due to deformation of essential parts of the lock device when the trunk lid is kept used for a long time.

Accordingly, it is an object of the present invention to provide a lock device which is free of the above-mentioned drawbacks.

According to the present invention, there is provided a lock device for a vehicle seat, which comprises a cover member that is stably fitted to a base plate of the lock device while covering essential parts of the lock device and assuring a relative positioning between the cover member and the base plate.

According to the present invention, there is provided a seat lock device for a vehicle, which can assuredly and smoothly bring about a locked condition of the seat in spite of its compact construction.

In accordance with a first aspect of the present invention, there is provided a lock device for locking a seat of a vehicle relative to a striker fixed to a vehicle body, which comprises a base plate (2) having a striker receiving recess (2a) for receiving therein the striker (200); a latch plate (3) rotatably connected to the base plate (2) and having a striker catching recess (3b) for catching the striker (200), the latch plate (3) being rotatable between a latch position to cause the striker catching recess (3b) to catch the striker (200) and an unlatch position to cause the striker catching recess (3b) to release the striker (200); a lock plate (4) rotatably connected to the base plate (2) and rotatable between a lock position to cause the latch plate (3) to be locked at the latch position and an unlock position to cause the latch plate (3) to be unlocked; a cover member (6) having a U-shaped flange (6d) formed thereon, the cover member (6) covering one major surface of the base plate (2) having the U-shaped flange (6d) neatly disposed on a peripheral edge of the striker receiving recess (2a); pawls (2d, 2d, 2e) provided by the base plate (2), the pawls being depressed toward the cover member (6); recesses (6f, 6f, 6g) provided by the cover member (6) for receiving the pawls (2d, 2d, 2e) respectively; and stoppers provided by respective walls of the recesses (6f, 6f, 6g) for preventing the pawls (2d, 2d, 2e) from being disengaged from the recesses (6f, 6f, 6g).

In accordance with a second aspect of the present invention, there is provided a lock device for locking a seat of a vehicle relative to a striker fixed to a vehicle body, which comprises a base plate (2) having a striker receiving recess (2a) for receiving therein the striker (200); a latch plate (3) rotatably connected to the base plate (2) through a first shaft (3a) and having a striker catching recess (3b) for catching the striker (200), the latch plate (3) being rotatable between a latch position to cause the striker catching recess (3b) to catch the striker (200) and an unlatch position to cause the striker catching recess (3b) to release the striker (200); a lock plate (4) rotatably connected to the base plate (2) through a second shaft (4a) and rotatable between a lock position to cause the latch plate (3) to be locked at the latch position and an unlock position to cause the latch plate (3) to be unlocked; a cover member (6) having a U-shaped flange (6d) formed thereon, the cover member (6) covering one major surface of the base plate (2) having the U-shaped flange (6d) neatly disposed on a peripheral edge of the striker receiving recess (2a); pawls (2d, 2d, 2e) provided by the base plate (2), the pawls being depressed toward the cover member (6); recesses (6f, 6f, 6g) provided by the cover member (6) for receiving the pawls (2d, 2d, 2e) respectively; stoppers provided by respective walls of the recesses (6f, 6f, 6g) for preventing the pawls (2d, 2d, 2e) from being disengaged from the recesses (6f, 6f, 6g); openings (2f, 2f) provided by the base plate (2); ribs (6h, 6h) provided by the cover member (6), the ribs being inserted into the openings (2f, 2f) respectively for achieving a relative positioning between the base plate (2) and the cover member (6); a first spring (8) for biasing the latch plate (3) to turn toward the unlatch position, one end of the first spring (8) being connected to a part of the latch plate (3); a second spring (9) for biasing the lock plate (9) to turn toward the lock position; a pressing cam (7) rotatably connected to the base plate (2) through the second shaft (4a), the pressing cam (7) having a projection (7c) for catching the other end of the first spring (8) and an engaging arm (7d) that is engageable with a part of the lock plate (4), so that the rotation of the lock plate (4) toward the unlock position is made against the force of the first spring (8); and a holding plate (5) that holds one end of the first shaft (3a) and one end of the second shaft (4a), the holding plate (5) being detachably connected to the cover member (6) while holding therebetween the base plate (2), the latch plate (3), the lock plate (4) and the pressing cam (7).

BRIEF DESCRIPTION OF THE DRAWINGS

Other objects and advantages of the present invention will become apparent from the following description when taken in conjunction of the accompanying drawings, in which.

DETAILED DESCRIPTION OF THE INVENTION

In the following, the lock device of the present invention will be described in detail with reference to the accompanying drawings.

For ease of understanding, explanation for the lock device will be made with respect to a case in which the lock device is mounted to a pivotal seat back of a seat mounted in a motor vehicle, and for ease of description, various directional terms, such as right, left, upper, lower, rightward and the like will be used in the following description. However, such terms are to be understood with respect to only a drawing or drawings on which corresponding part or portion is shown.

Before making detailed explanation on the lock device of the present invention, the description will be directed to a vehicle seat to which the lock device is practically applied. The vehicle seat is mounted in a motor vehicle with its front side facing forward and comprises a seat cushion that is mounted on a floor of the vehicle and a pivotal seat back that is pivotally connected at its lower part to a rear part of the seat cushion through a pivot shaft. That is, the seat back is pivotal between a front-rest position (or not in-use position) where the seat back falls down on the seat cushion and a rear-stand position (or in-use position) where the seat back stands on the seat cushion while being locked relative to a vehicle body (or the seat cushion) due to a locking work of the lock device of the present invention.

For establishing the locked condition of the seat back at the rear-stand position, one major part (or lock unit) of the lock device of the invention is mounted to one side portion of the seat back and the other major part (or striker) of the lock device is mounted to a given position of a side wall of the vehicle body. That is, as will become apparent as the description proceeds, when the seat back is raised up from the front-rest position and brought to a given angular position, the lock unit catches the striker thereby to establish the locked condition of the seat back at the rear-stand position.

Now, the detail of the lock device of the present invention will be described in the following with the aid of the drawings, particularly FIG. 6.

Figure 6:
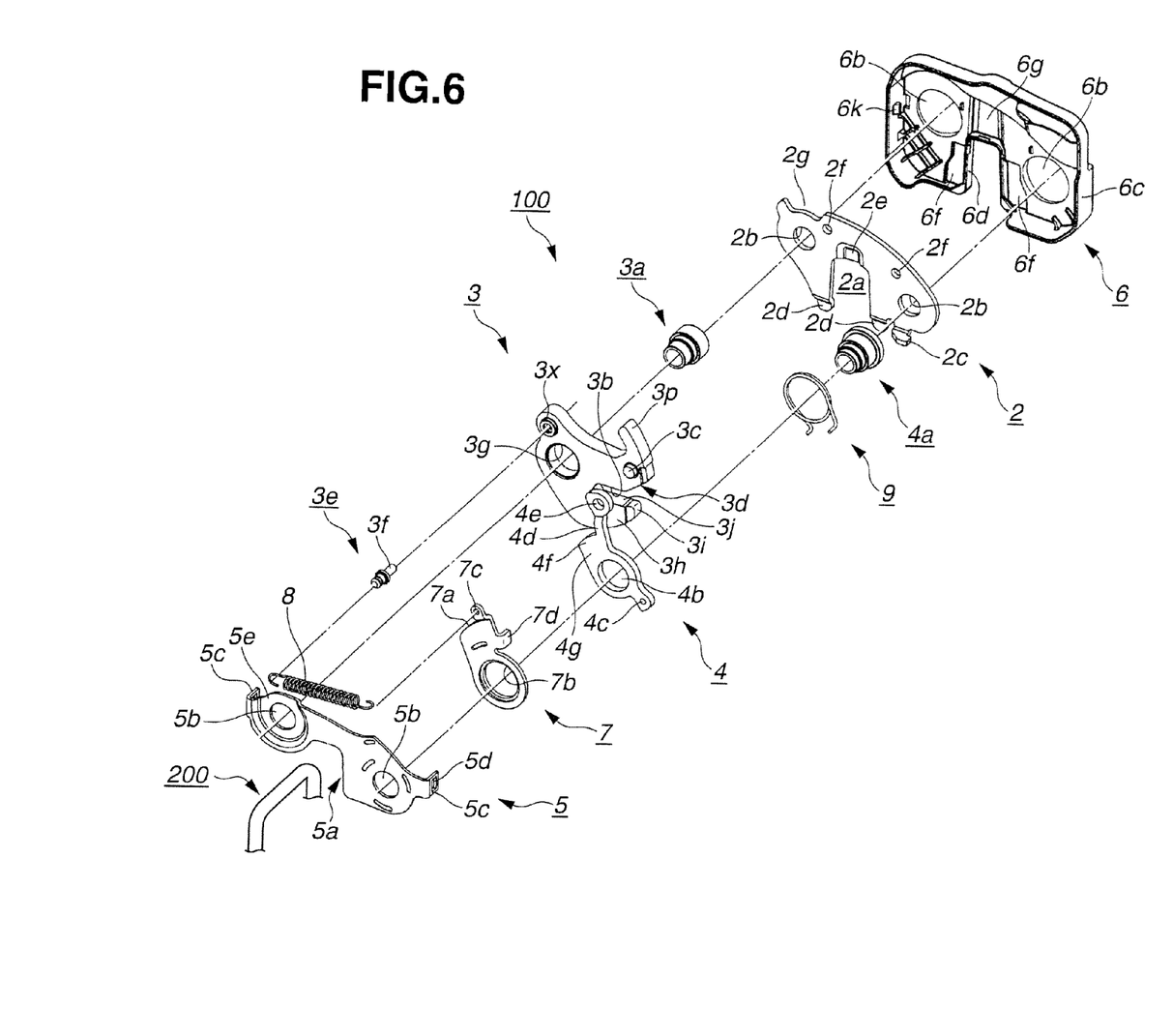
FIG. 6 is an exploded view of the lock device of the present invention.
Figure 7:
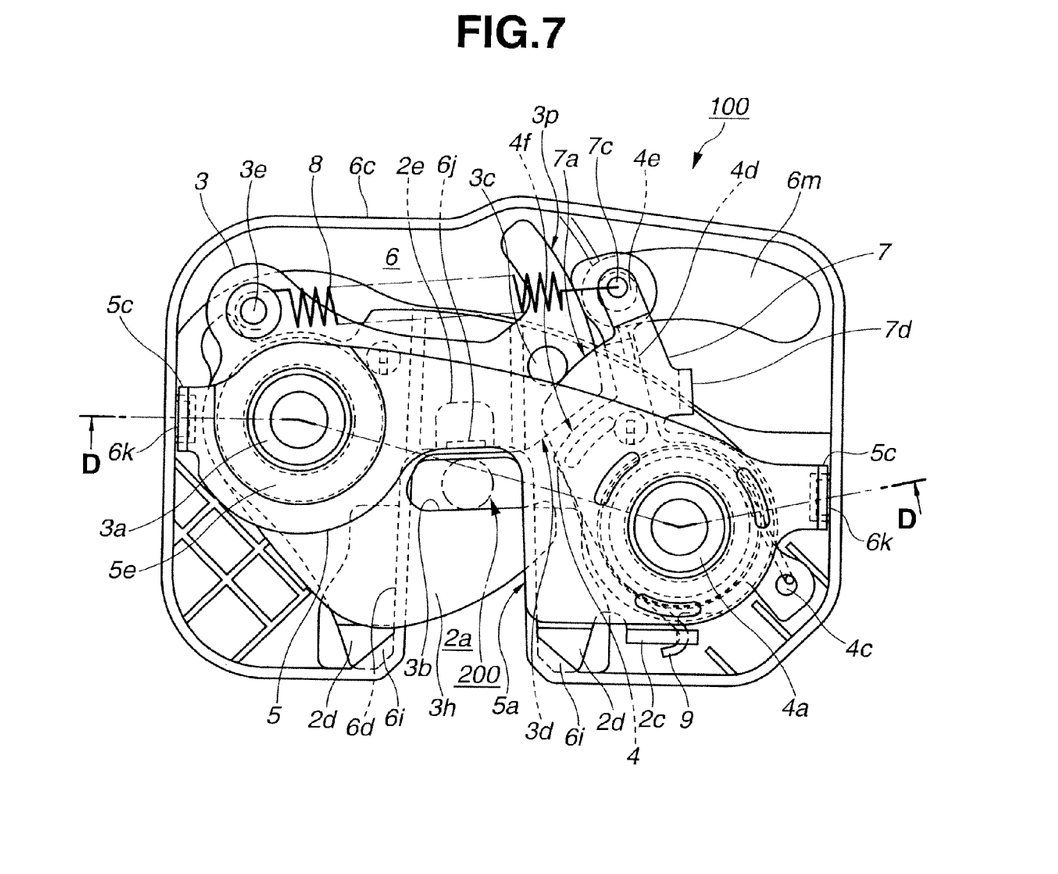
FIG. 7 is a plan view of the lock device of the present invention, showing a locked condition of the lock device.

Referring to FIG. 6, there is shown an exploded view of the lock device of the present invention.

The lock device generally comprises two major parts which are a lock unit 100 that is mounted to the seat back of the seat and a striker 200 that is fixed to the side wall of the vehicle body, as has been mentioned hereinabove.

As is seen from FIG. 6, the lock unit 100 comprises a base plate 2 that has a striker receiving recess 2a which is rectangular in shape.

The base plate 2 is formed at both sides of the recess 2a with respective openings 2b and 2b for tightly receiving therein a latch plate shaft 3a and a lock plate shaft 4a respectively.

For the purpose which will become apparent hereinafter, the base plate 2 is formed at an upper left portion thereof with a recess 2g that has a rounded bottom wall.

Denoted by numeral 3 is a latch plate that has a circular opening 3g through which the latch plate shaft 3a passes, so that the latch plate 3 is rotatably disposed on the latch plate shaft 3a.

Denoted by numeral 4 is a lock plate 4 that has a circular opening 4b through which the lock plate shaft 4a passes, so that the lock plate 4 is rotatably disposed on the lock plate shaft 4a.

The latch plate 3 is formed with a striker catching recess 3b that is sized to receive the striker 200 and defined between upper and lower finger portions 3d and 3h of the latch plate 3. The lower finger portion 3h has a leading end 3i projected rightward and an upper surface 3j.

The striker catching recess 3b is defined by the upwardly facing surface 3j of the lower finger portion 3h and a downwardly facing surface (no numeral) of the upper finger portion 3d.

A spring holding pin 3e is put in an opening 3x formed in an upwardly projected portion of the latch plate 3.

A right end 3f of the spring holding pin 3e, which extends rightward from the opening 3x of the latch plate 3, is slidably engaged with the rounded bottom wall of the above-mentioned recess 2g of the base plate 2. Due to this slidable engagement between the right end 3f of the pin 3e and the recess 2g, the pivoting movement of the latch plate 3 about the latch plate shaft 3a has a limited range.

Figure 10:
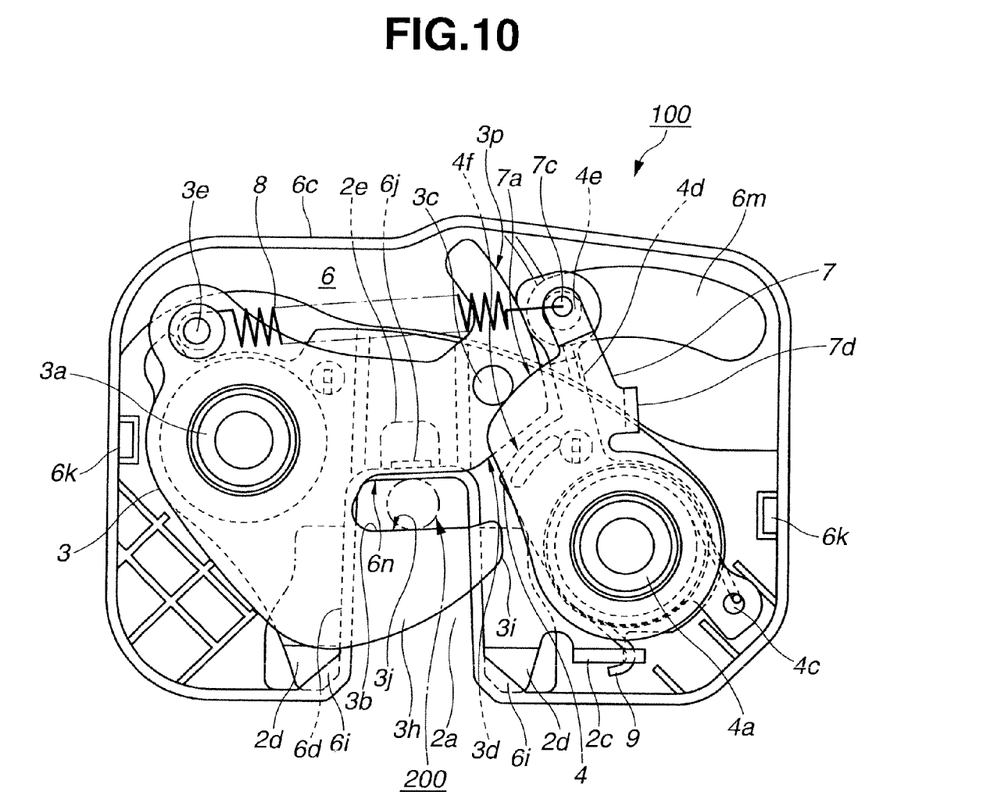
FIG. 10 is a view similar to FIG. 9, but showing the locked condition of the lock device.

As will be described in detail hereinafter, when the lock unit 100 assumes a locked condition as shown in FIG. 10, the latch plate 3 takes such an angular position as to cause the striker catching recess 3b to across the striker receiving recess 2a of the base plate 2.

It is to be noted that the latch plate 3 is entirely covered with a plastic film 10 (see FIG. 8) except the leading end 3i. Of course, an entire surface of the latch plate 3 that defines the striker catching recess 3b is also covered with the plastic film. Preferably, an elastic one is used as the plastic film. It is preferable to use an elastic one as the plastic film.

For the purpose that will be clarified hereinafter, the latch to plate 3 is further provided with a pin 3c that projects leftward from the upper finger portion 3d and a projection 3p that projects radially outward from the upper finger portion 3d, as shown.

The lock plate 4 is formed with a rounded lock edge 4f that is used for locking the latch plate 3 when the striker 200 is sufficiently received in both the striker receiving recess 2a of the base plate 2 and the striker catching recess 3b of the latch plate 3.

Below the rounded lock edge 4f, the lock plate 4 has a back edge 4g that is used for unlocking the latch plate 3 when the projection 3p contacts the back edge 4g.

The rounded lock edge 4f of the lock plate 4 is concentric with the circular opening 4b of the lock plate 4. That is, in the locked condition of the latch plate 3, the rounded lock edge 4f is in contact with a jaw part of the upper finger portion 3d of the latch plate 3 (see FIG. 10).

For holding left ends of the latch and lock plate shafts 3a and 4a, there is further provided a holding plate 5 that is postured in parallel with the base plate 2.

That is, two openings 5b and 5b provided by the holding plate 5 receive therein the left ends of the latch and lock plate shafts 3a and 4a respectively. By caulking the left ends of the latch and lock plate shafts 3a and 4a, the left ends are secured to the holding plate 5. The opening 5b for the latch plate shaft 3a is depressed toward the base plate 2 to provide a depressed portion 5e, as shown.

Denoted by reference numeral 5a in FIG. 6 is a straight wall edge possessed by the holding plate 5, which becomes matched with a right wall edge of the striker receiving recess 2a of the base plate 2 when the holding plate 5 is properly mounted to a cover member 6 in an after-mentioned manner. That is, the straight wall edge 5a of the holding plate 5 can reinforce the striker receiving recess 2a of the base plate 2.

A projection 4c is provided at a diametrically opposed portion of the rounded lock edge 4f with respect to the circular opening 4c.

Between the projection 4c of the lock plate 4 and a projection 2c of the base plate 2, there is operatively arranged an annular torsion spring 9 that biases the lock plate 4 to turn in a counterclockwise (or locking) direction to engage the rounded lock edge 4f of the lock plate 4 with the jaw part of the upper finger portion 3d of the latch plate 3. The annular torsion spring 9 is disposed around the lock plate shaft 4a between the lock plate 4 and the base plate 2.

The lock plate 4 is formed with a lever portion 4d near the rounded lock edge 4f, that extends toward the upper finger portion 3d of the latch plate 3. The lever portion 4d is used for turning the lock plate 4 in a lock cancelling direction as will be described hereinafter.

Although not shown in the drawing, to an opening 4e of the lever portion 4d, there is connected one end of an operation rod that extends from a lock-cancelling knob mounted on an exposed given area of the seat back. That is, upon manipulation of the control knob by an operator (or passenger in the vehicle), the operation rod is moved in a direction to pivot the lock plate 4 in the lock cancelling direction.

About the lock plate shaft 4a, there is rotatably disposed further a pressing cam 7 that functions to press the latch plate 3 in the locked condition in a counterclockwise direction. For the rotatable arrangement, the pressing cam 7 is formed with a circular opening 7b that receives therein the lock plate shaft 4a.

The pressing cam 7 is formed with a cam surface 7a that can be in contact with the above-mentioned pin 3c of the latch plate 3. The pressing cam 7 has near the cam surface 7a a projection 7c for catching one end of a tension spring 8. The other end of the tension spring 8 is caught by the above-mentioned spring holding pin 3e. Due to the biasing force of the tension spring 8, the latch plate 3 is biased to turn in a clockwise (or lock cancelling) direction and the pressing cam 7 is biased to turn in a counterclockwise direction.

The pressing cam 7 is further formed with an engaging arm 7d that projects toward the lock plate 4. That is, when the latch plate 3 becomes unlocked due to turning the lock plate 4 in a clockwise direction, the engaging arm 7d functions to turn the pressing cam 7 in a clockwise direction against the biasing force of the tension spring 8.

Figure 8:
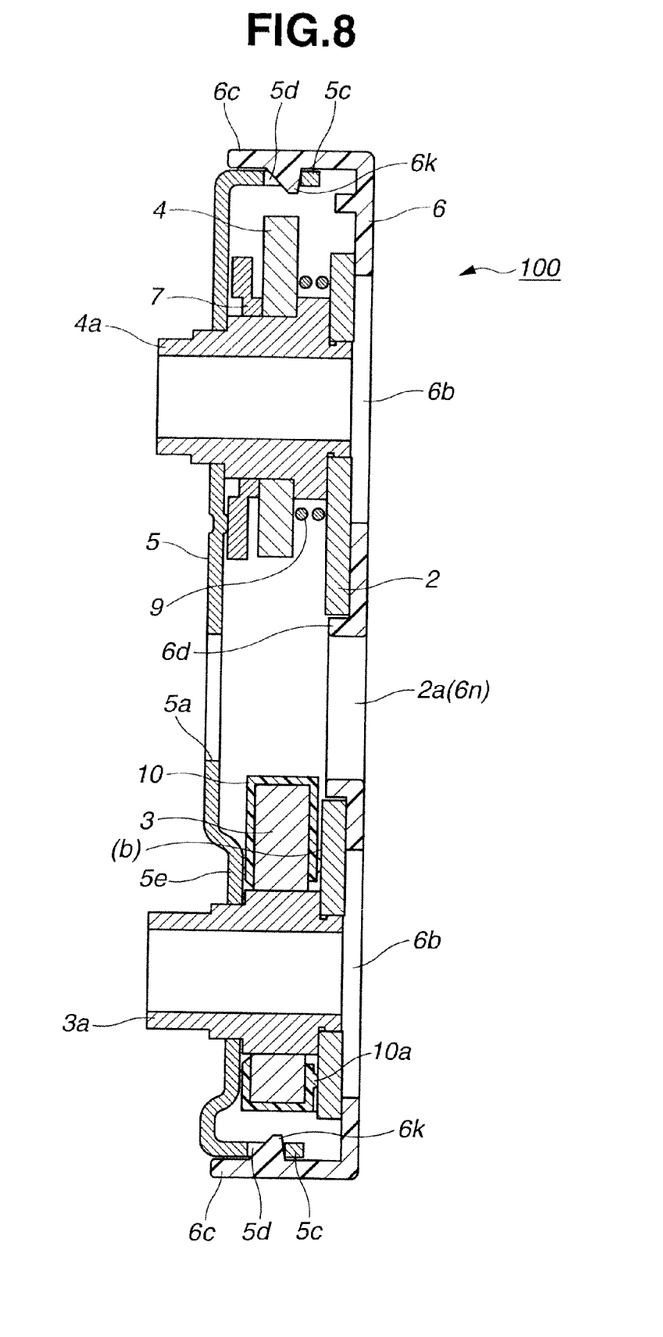
FIG. 8 is an enlarged sectional view taken along the line D-D of FIG. 7.

The base plate 2, latch plate 3, lock plate 4, pressing cam 7 and holding plate 5 which are assembled in the above-mentioned manner constitute a thinner mechanism unit as will be understood from FIG. 8.

Referring back to FIG. 6, the thinner mechanism unit is neatly received in a cover member 6 that is made of a metal, a plastic or the like. As shown, when the mechanism unit is properly received in the cover member 6, a right major surface of the base plate 2 faces and contacts an inner base surface of the cover member 6.

Figure 5:
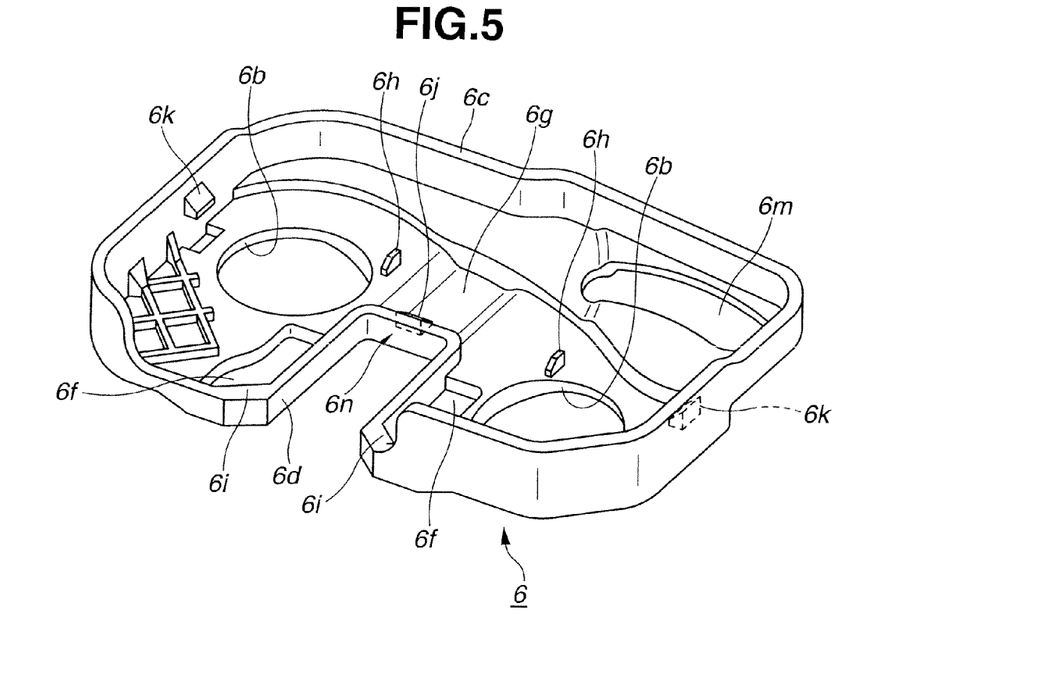
FIG. 5 is a perspective view of the cover member, showing the inside of the cover member.

As will be understood from FIGS. 5 and 6, the cover member 6 is formed with larger circular openings 6b and 6b for receiving right end portions of the latch and lock plate shafts 3a and 4a.

The cover member 6 is further formed with a surrounding wall 6c that extends around a periphery of the cover member 6. Furthermore, the cover member 6 is further formed with a generally U-shaped flange (or bridge) 6d at a portion that coincides with the striker receiving recess 2a of the base plate 2.

For the reason as will become apparent hereinafter, an axial length (or height) of the U-shaped flange 6d of the cover member 6 is so set as not to project beyond the striker receiving recess 2a of the base plate 2, as is seen from FIG. 8.

As will be understood from FIGS. 2, 3, 4 and 6, upon assembly, the U-shaped flange 6d of the cover member 6 is snugly received in the striker receiving recess 2a of the base plate 2. With this, a naked periphery of the striker receiving recess 2a is covered by the flange 6d of the plastic cover member 6. With this plastic covering, a noise that would be produced when the striker 200 hits against the wall of the striker receiving recess 2a is suppressed or at least damped.

Referring back to FIG. 5, denoted by reference 6m is an elongate opening formed in the cover member 6, through which the above-mentioned operation rod from the lock-canceling knob passes.

The cover member 6 is detachably connected to the thinner mechanism by a fixing means which will be described in the following.

As is seen from FIG. 5, the cover member 6 is formed, at laterally opposed portions of an inner surface of the wall 6c, with respective bosses 6k and 6k each having a sloped top surface, and as is seen from FIG. 6, the holding plate 5 is formed at its lateral ends with respective arms 5c and 5c each projecting toward the cover member 6 and having an opening 5d.

When it is intended to couple the cover member 6 and the mechanism unit, the mechanism unit is pressed against the inner wall of the cover member 6 with a given force. With this pressing action, the two bosses 6k and 6k are pushed into the openings 5d of the arms 5c and 5c in a snap-action manner.

For assuring the setting of the U-shaped flange 6d of the plastic cover member 6 in the striker receiving recess 2a of the base plate 2, the following setting means is provided.

That is, the setting means comprises three pawls 2d, 2d and 2e that are formed by the base plate 2 around the striker receiving recess 2a and depressed toward the cover member 6 and three recesses 6f, 6f and 6g that are formed by the cover member 6 around the U-shaped flange 6d. As will become apparent hereinafter, in the process of accurately fitting the base plate 2 to the cover member 6, the depressed pawls 2d, 2d and 2e of the base plate 2 are received in the respective recesses 6f, 6f and 6g of the cover member 6 before making axial movement of the base plate 2 relative to the cover member 6.

As will be seen from FIG. 5, for receiving the depressed pawls 2d, 2d and 2e of the base plate 2 (see FIG. 3), the recesses 6f, 6f and 6g of the cover member 6 are formed at their front portions with small projections 6i, 6i and 6j behind which small pockets 6p, 6p, 6p' are formed for receiving the depressed pawls 2d, 2d and 2e.

Positioning means is further provided for establishing a relative positioning between the cover member 6 and the base plate 2 as will be described in the following.

Figure 1:
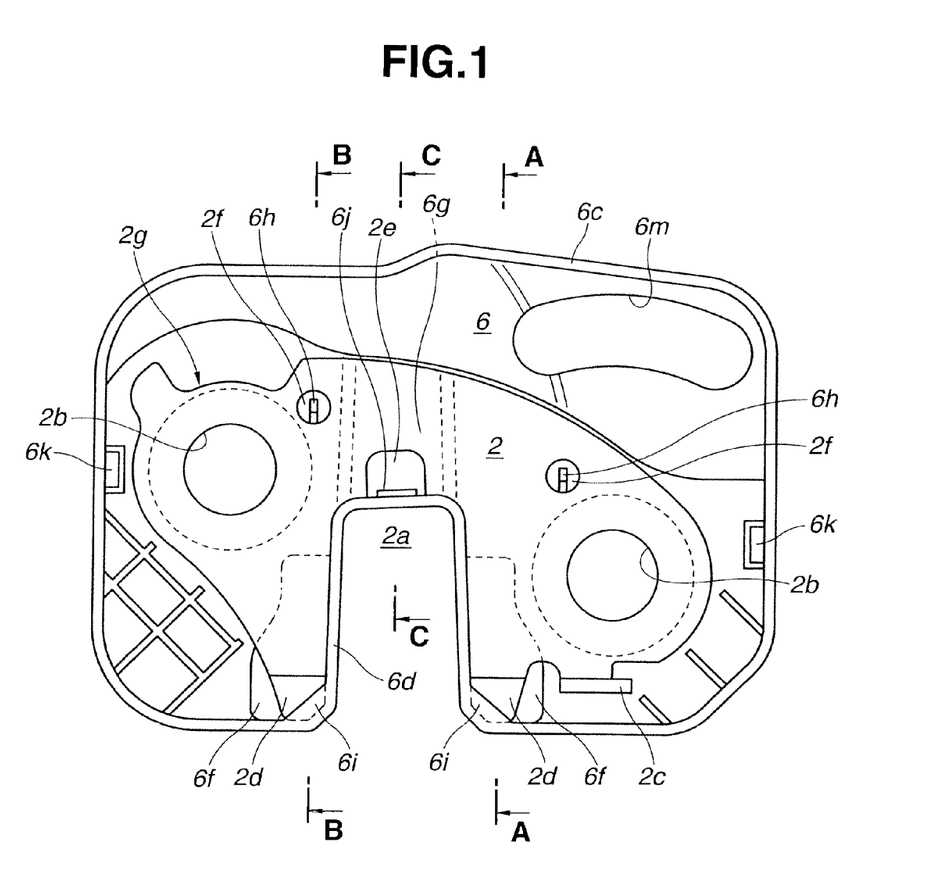
FIG. 1 is a plan view of a unit consisting of a cover member and a base plate, showing a condition in which the cover member and the base plate are correctly coupled.

As is seen from FIGS. 1, 5 and 6, the positioning means comprises two openings 2f and 2f (see FIGS. 1 and 6) that are formed in the base plate 2 at both sides of the striker receiving recess 2a, and two ribs 6h and 6h (see FIG. 5) that are formed on the inner wall of the cover member 6 at positions corresponding to those of the two openings 2f and 2f. Each rib 6h has a sloped top surface. Upon coupling, the two ribs 6h and 6h are put into the two openings 2f and 2f to achieve the relative positioning between the cover member 6 and the base plate 2, and thus, positioning of the U-shaped flange 6d of the cover member 6 relative to the striker receiving recess 2a of the base plate 2 is established.

In the following, operation of the lock device of the present invention will be described in detail with the aid of the drawings, especially FIGS. 9 and 10.

For ease of description, the explanation will be commenced with respect to a rest condition of the lock device.

Figure 9:
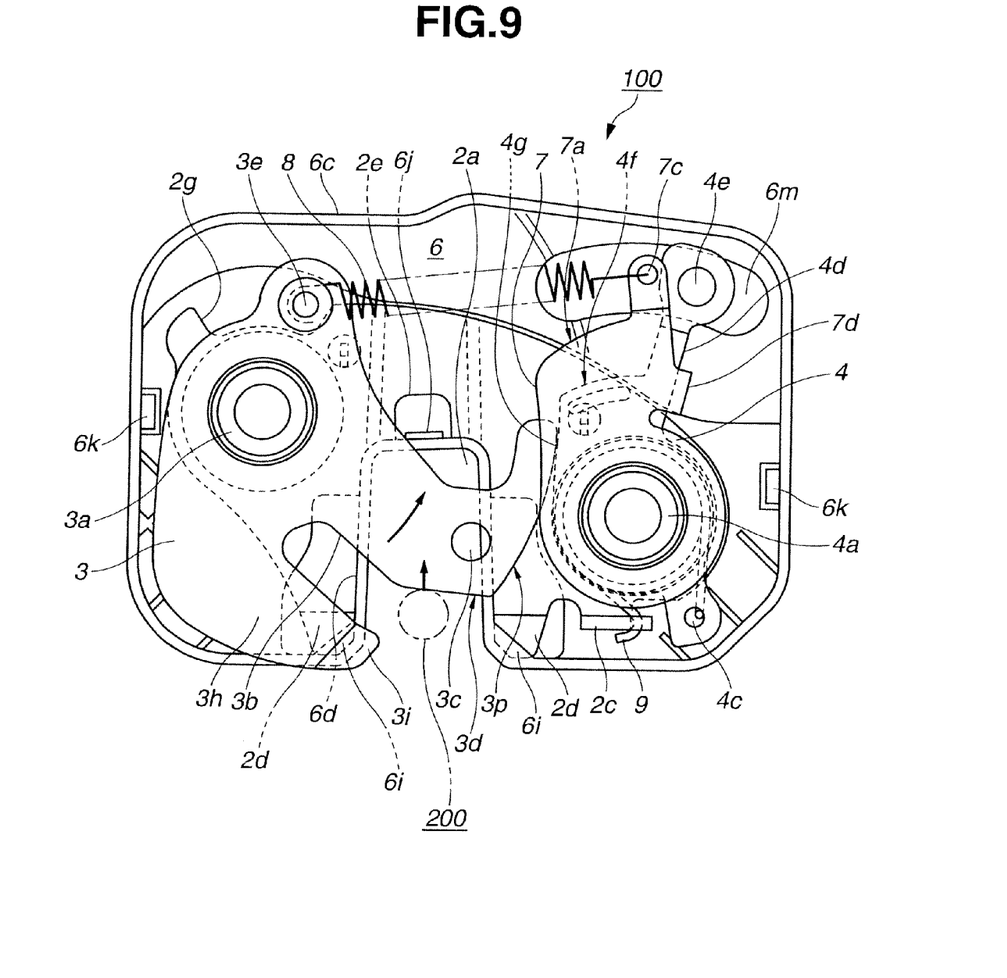
FIG. 9 is a plan view of the lock device of the present invention with a holding plate removed, showing a condition in which the lock device is in the process of arriving at the locked condition.

Under this condition, the associated seat back assumes the front-rest position falling down on the seat cushion, and the lock unit 100 takes an unlock condition as shown in FIG. 9 wherein the latch plate 3 and the lock plate 4 assume their rest positions. That is, under this rest condition, the projection 3p of the latch plate 3 contacts the back edge 4g of the lock plate 4 to place the lock plate 4 at a lock cancelling position. Under this, the latch plate 3 is unlocked.

When, due to raising movement of the seat back from its rest position (viz., not in-use position), the seat back comes to the predetermined angular position (viz., in-use position), the striker receiving recess 2a of the base plate 2 receives the striker 200, as will be understood from FIG. 9.

Upon this, the striker 200 moves into the striker receiving recess 2a and abuts against the upper finger portion 3d of the latch plate 3 and pushes the upper finger portion 3d upward in the drawing against the force of the tension spring 8. Due to insertion of the striker 200 into the striker receiving recess 2a, the latch plate 3 is forced to turn in a counterclockwise direction in FIG. 9 about the latch plate shaft 3a leaving the projection 3p of the latch plate 3 from the back edge 4g of the lock plate 4.

When, as is seen from FIG. 10, the projection 3p of the latch plate 3 is disengaged from the back edge 4g of the lock plate 4, the lock plate 4 is allowed or forced to turn in a counterclockwise direction about the lock plate shaft 4a due to the biasing force of the annular torsion spring 9, and stopped at an angular position where the rounded lock edge 4f of the lock plate 4 abuts against the jaw part of the upper finger portion 3d of the latch plate 3. Upon this, a clockwise turning of the lock plate 3, which is induced by the biasing force of the torsion spring 8, is blocked by the lock edge 4f of the lock plate 4.

Under this condition, the latch plate 3 is locked while catching the striker 200 as will be understood from FIG. 10. In other words, the striker 200 is locked by the locked latch plate 3.

Under this locked condition of the striker 200, due to the biasing force of the tension spring 8, the pressing cam 7 is biased to turn in a counterclockwise direction causing the cam surface 7a thereof to press the pin 3c of the latch plate 3. With this, the latch plate 3 is biased to turn in a counterclockwise direction.

Accordingly, the lower finger portion 3h of the latch plate 3 is biased to turn upward in FIG. 10 pressing the striker 200 against the bottom of the striker receiving recess 2a of the base plate 2. Thus, undesired play of the striker 200 is suppressed. In other words, undesired play of the lock unit 100 relative to the striker 200 is suppressed or at least minimized.

Thus, under this condition, the seat back is locked at the predetermined angular position by the lock device. Thus, a passenger can use the seat as a normal seat having a back rest.

When now the passenger intends to fold up the seat back, the lock-cancelling knob on the seat back is handled by the passenger. With this, the lever portion 4d of the lock plate 4 is moved rightward in FIG. 10 causing the lock plate 4 to turn in a clockwise direction. Thus, the rounded lock edge 4f of the lock plate 4 is released from the jaw part of the upper finger portion 3d of the latch plate 3 and thus the latch plate 3 is permitted to turn in a clockwise direction due to the biasing force of the torsion spring 8.

The turning of the latch plate 3 in the clockwise direction releases the striker 200 from the striker catching recess 3b of the latch plate 3 and at the same time from the striker receiving recess 2a of the base plate 2. Under this condition, the lock unit 100 mounted on the seat back is released from the striker 200 fixed to the vehicle body, and thus, the locked condition of the seat back at the predetermined angular position is cancelled. Under this condition, the seat back can be folded up upon receiving a certain handling force.

It is to be noted that when, due to manipulation of the lock-cancelling knob on the seat back, the lock plate 4 is turned in the clockwise direction in FIG. 10, the lever portion 4d of the lock plate 4 abuts against the engaging arm 7d of the pressing cam 7 and thus turns the pressing cam 7 in a clockwise direction to its original position of FIG. 9.

The present invention will be much clearly understood from the following description.

As is seen from FIGS. 2, 3, 4, 5 and 6, the depressed pawls 2d and 2d of the base plate 2 are received in respective pockets 6p and 6p each being defined between a major part of the cover member 6 and the small projection 6i of the cover member 6, and the depressed pawl 2e of the base plate 2 is received in a pocket 6p' defined between the major part of the cover member 6 and the small projection 6j of the cover member 6.

Figure 3:
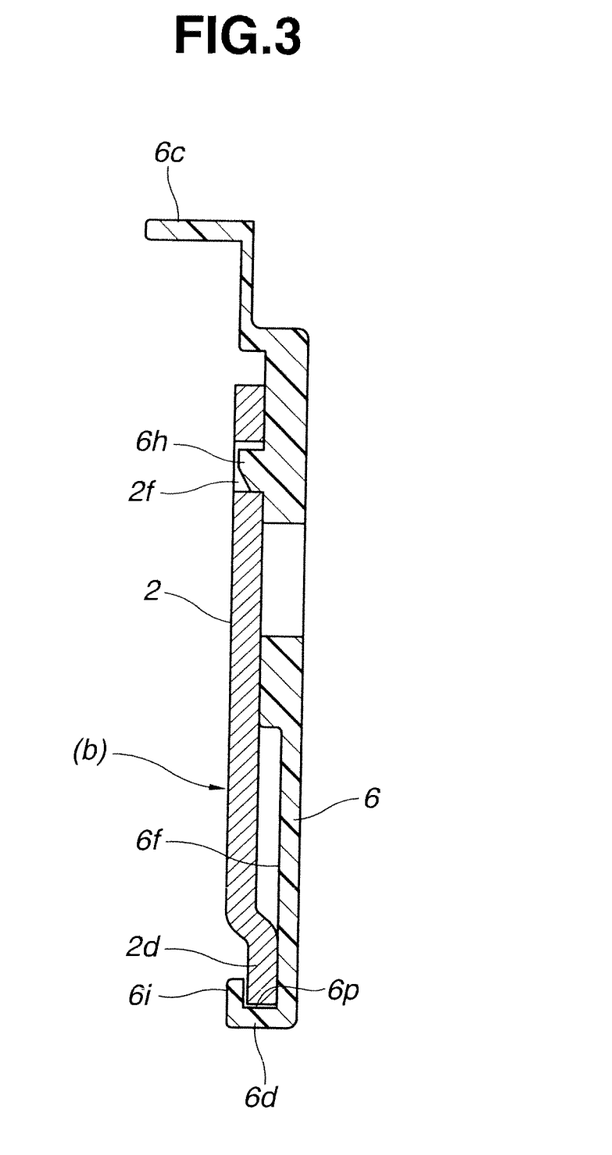
FIG. 3 is a sectional view taken along the line B-B of FIG. 1.

Furthermore, as is seen from FIGS. 3, 5 and 6, the ribs 6h and 6h (see FIG. 5) of the cover member 6 are snugly received in the openings 2f and 2f (see FIGS. 3 and 6) of the base plate 2.

Thus, both the lateral and axial displacements of the base plate 2 relative to the cover member 6 and vice versa are assuredly prevented. Accordingly, even if the lock unit 100 is applied with a big shock through the striker 200 in its practical use, undesired displacement of the cover member 6 relative to the base plate 2 is suppressed and thus the U-shaped flange 6d of the cover member 6 can keep its original position relative to the striker receiving recess 2a of the base plate 2. In other words, even if such big shock is applied to the lock unit 100 by the striker 200, the striker receiving recess 2a of the base plate 2 is prevented from exposing its naked metal surface skin. Thus, undesired noisy collision of the striker 200, which is made of a metal, against the naked metal surface is prevented.

Of course, due to the same reason, an outer surface of the metallic striker 200 is suppressed from having scratches.

The U-shaped flange 6d of the cover member 6 is disposed on the peripheral edge of the striker receiving recess 2a of the base plate 2 while entirely covering the peripheral edge of the recess 2a, and such disposal is reinforced by the engagement between the depressed pawls 2d, 2d and 2e of the base plate 2 and the pockets 6p, 6p, 6p' provided by the cover member 6. Accordingly, coupling between the base plate 2 and the cover member 6 is tightly achieved.

Figure 2:
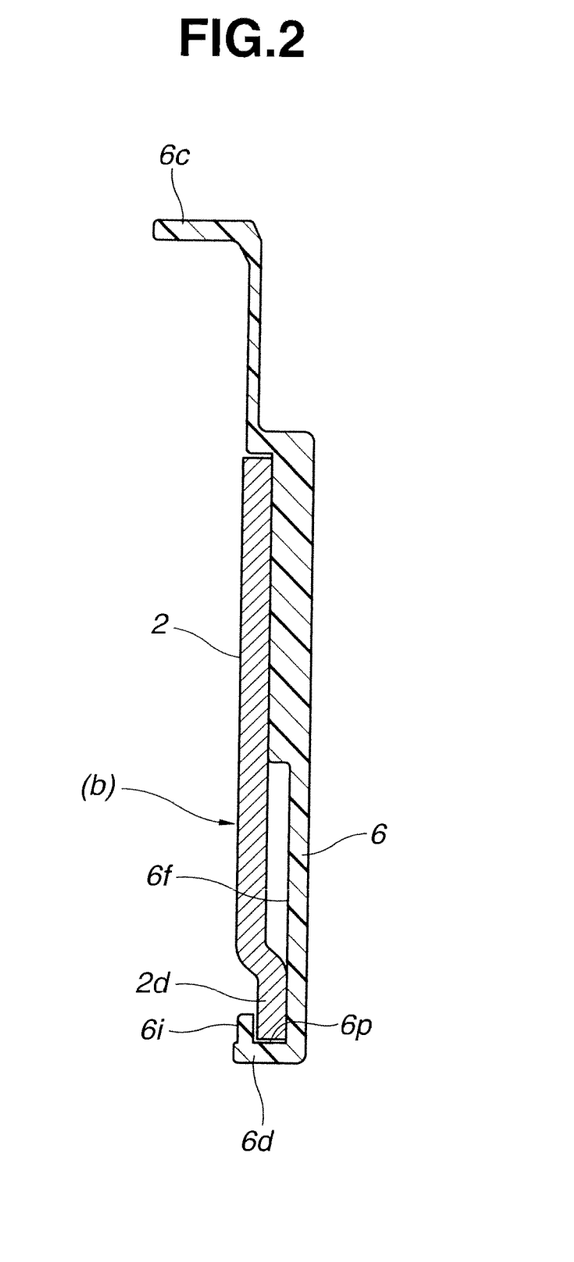
FIG. 2 is a sectional view taken along the line A-A of FIG. 1.
Figure 4:
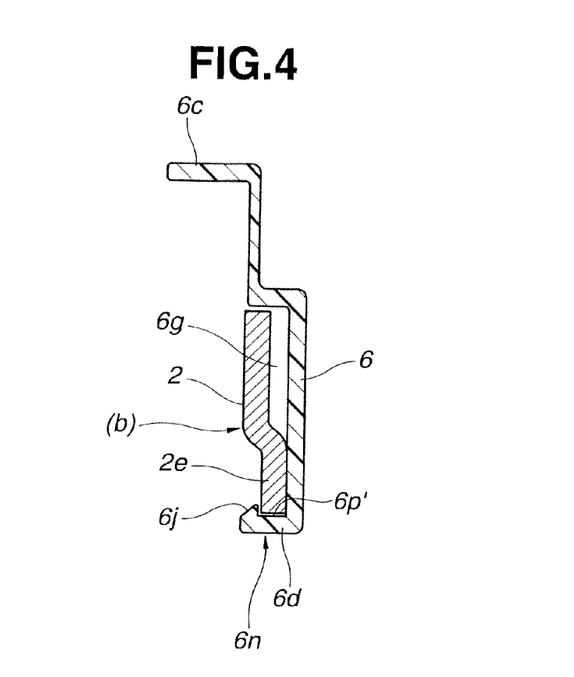
FIG. 4 is a sectional view taken along the line C-C of FIG. 1.

As is seen from FIGS. 2 to 4, because the depressed pawls 2d, 2d and 2e of the base plate 2 are directed toward the cover member 6 and snugly received in the respective pockets 6p, 6p and 6p' provided by the cover member 6, the lock unit 100 thus assembled can provide therein a smoothed flat space for neatly housing the latch plate 3 and lock plate 4.

In FIGS. 2 to 4 and 8, denoted by reference (b) is an inner surface of the base plate 2. As is seen from FIG. 8, the latch plate 3 is placed very close to the inner surface of the base plate 2. As is known, for making such close positioning possible, formation of the smoothed flat space in the lock unit 100 is necessary.

Furthermore, because the pawls 2d, 2d and 2e are depressed toward the cover member 6, the latch plate 3 can smoothly rotate about its shaft 3a without being interrupted by the projections 6i, 6i and 6j of the cover member 6, as will be understood from FIGS. 2, 3, 4 and 8.

In FIG. 8, denoted by reference numeral 10a is one of three projections that are integrally formed on the plastic film 10 that covers the latch plate 3. Due to provision of such projections 10a, the contact resistance between the latch plate 3 and the base plate 2 is reduced.

Furthermore, since, as is seen from FIG. 8, the U-shaped flange 6d of the cover member 6 is so sized as not to project beyond the striker receiving recess 2a of the base plate 2, the rotation of the latch plate 3 is smoothly made without being interrupted by the U-shaped flange 6d.

For fixing the base plate 2 to the cover member 6, the following fixing steps are usable.

First, the base plate 2 is put in the cover member 6, and then the base plate 2 is so postured that the striker receiving recess 2a of the base plate 2 is roughly registered with the U-shaped flange 6d of the cover member 6. Then, the base plate 2 is moved downward in FIG. 6 along an axis of the U-shaped flange 6d for inserting the three depressed pawls 2d, 2d and 2e of the base plate 2 into the respective pockets 6p, 6p and 6p' provided behind the projections 6i, 6i and 6j of the cover member 6, and then, a central area of the base plate 2 is pressed against the inner wall of the cover member 6. Upon this pressing, as will be understood from FIGS. 3 and 5, the two ribs 6h and 6h of the cover member 6 are pressed into the respective openings 2f and 2f of the base plate 2.

With the above-mentioned fixing steps, relative positioning and tight coupling between the base plate 2 and the cover member 6 are both established at the same time. Thus, undesired play and rattle of the base plate 2 relative to the cover member 6 are assuredly suppressed.

In the above, the description is directed to a lock device that is arranged to lock a pivotal seat back to a striker fixed to a vehicle body. However, if desired, the lock device can be used for locking a pivotal seat cushion to a striker fixed to a vehicle body.

The entire contents of Japanese Patent Application 2012-101976 filed Apr. 27, 2012 are incorporated herein by reference.

Although the invention has been described above with reference to the embodiment of the invention, the invention is not limited to such embodiment as described above. Various modifications and variations of the embodiment may be carried out by those skilled in the art, in light of the above description.

What is claimed is:

1. A lock device for locking a seat of a vehicle relative to a striker fixed to a vehicle body, comprising:
a base plate having a striker receiving recess for receiving therein the striker;
a latch plate rotatably connected to the base plate and having a striker catching recess for catching the striker, the latch plate being rotatable between a latch position to cause the striker catching recess to catch the striker and an unlatch position to cause the striker catching recess to release the striker;
a lock plate rotatably connected to the base plate and rotatable between a lock position to cause the latch plate to be locked at the latch position and an unlock position to cause the latch plate to be unlocked;
a cover member having a U-shaped flange formed thereon, the cover member covering one major surface of the base plate having the U-shaped flange neatly disposed on a peripheral edge of the striker receiving recess;
pawls provided by the base plate, the pawls being depressed toward the cover member;
recesses provided by the cover member for receiving the pawls respectively; and
stoppers provided by respective walls of the recesses for preventing the pawls from being disengaged from the recesses.

2. A lock device as claimed in claim 1, further comprising:
openings provided by the base plate; and
ribs provided by the cover member, the ribs being inserted into the openings respectively for achieving a relative positioning between the base plate and the cover member.

3. A lock device as claimed in claim 2, in which an axial length of the U-shaped flange is so set as not to project beyond the striker receiving recess.

4. A lock device as claimed in claim 3, in which the pawls of the base plate are provided at a peripheral portion of the striker receiving recess, and in which the recesses of the cover member are provided at a peripheral portion of the U-shaped flange.

5. A lock device as claimed in claim 1, in which the stoppers comprise pockets each being defined between a major surface of the cover member and a projection provided by the cover member, the pockets receiving therein the pawls of the base plate.

6. A lock device as claimed in claim 1, in which the cover member is made of a metal or a plastic.

7. A lock device as claimed in claim 1, further comprising:
a first spring for biasing the latch plate to turn toward the unlatch position; and
a second spring for biasing the lock plate to turn toward the lock position.

8. A lock device as claimed in claim 7, further comprising:
a pressing cam that is rotatably connected to the base plate together with the lock plate, the pressing cam having a projection for catching one end of the first spring and an engaging arm that is engageable with a part of the lock plate, so that the rotation of the lock plate toward the unlock position is made against the force of the first spring.

9. A lock device as claimed in claim 8, further comprising:
a holding plate that is detachably connected to the cover member while holding therebetween the base plate, the latch plate, the lock plate and the pressing cam.

10. A lock device as claimed in claim 1, in which the seat is a seat back that is pivotally connected to a seat cushion mounted on a floor of the vehicle.

11. A lock device as claimed in claim 1, in which the seat is a seat cushion that is pivotally mounted on a floor of the vehicle.

12. A lock device for locking a seat of a vehicle relative to a striker fixed to a vehicle body, comprising:
 a base plate having a striker receiving recess for receiving therein the striker;
 a latch plate rotatably connected to the base plate through a first shaft and having a striker catching recess for catching the striker, the latch plate being rotatable between a latch position to cause the striker catching recess to catch the striker and an unlatch position to cause the striker catching recess to release the striker;
 a lock plate rotatably connected to the base plate through a second shaft and rotatable between a lock position to cause the latch plate to be locked at the latch position and an unlock position to cause the latch plate to be unlocked;
 a cover member having a U-shaped flange formed thereon, the cover member covering one major surface of the base plate having the U-shaped flange neatly disposed on a peripheral edge of the striker receiving recess;
 pawls provided by the base plate, the pawls being depressed toward the cover member;
 recesses provided by the cover member for receiving the pawls respectively;
 stoppers provided by respective walls of the recesses for preventing the pawls from being disengaged from the recesses;
 openings provided by the base plate;
 ribs provided by the cover member, the ribs being inserted into the openings respectively for achieving a relative positioning between the base plate and the cover member;
 a first spring for biasing the latch plate to turn toward the unlatch position, one end of the first spring being connected to a part of the latch plate;
 a second spring for biasing the lock plate to turn toward the lock position;
 a pressing cam rotatably connected to the base plate through the second shaft, the pressing cam having a projection for catching the other end of the first spring and an engaging arm that is engageable with a part of the lock plate, so that the rotation of the lock plate toward the unlock position is made against the force of the first spring; and
 a holding plate that holds one end of the first shaft and one end of the second shaft, the holding plate being detachably connected to the cover member while holding therebetween the base plate, the latch plate, the lock plate and the pressing cam.

* * * * *